(12) United States Patent
Ikawa et al.

(10) Patent No.: US 9,936,149 B2
(45) Date of Patent: Apr. 3, 2018

(54) IMAGING APPARATUS WITH TEMPERATURE SENSORS, IMAGING SYSTEM AND IMAGING METHOD

(71) Applicant: CANON KABUSHIKI KAISHA, Tokyo (JP)

(72) Inventors: Taisuke Ikawa, Tokyo (JP); Kazumasa Matsumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 208 days.

(21) Appl. No.: 14/743,640

(22) Filed: Jun. 18, 2015

(65) Prior Publication Data

US 2015/0373292 A1    Dec. 24, 2015

(30) Foreign Application Priority Data

Jun. 20, 2014 (JP) .................. 2014-127537

(51) Int. Cl.
*H04N 5/3745* (2011.01)
*H04N 5/341* (2011.01)
*H04N 5/355* (2011.01)
*H04N 5/361* (2011.01)

(52) U.S. Cl.
CPC ......... *H04N 5/3415* (2013.01); *H04N 5/3559* (2013.01); *H04N 5/361* (2013.01)

(58) Field of Classification Search
CPC .... H04N 5/37457; H04N 5/378; H04N 5/376; G01J 5/20

USPC .......................................... 250/208.1, 338.1
See application file for complete search history.

(56) References Cited

U.S. PATENT DOCUMENTS

| 6,465,784 | B1 * | 10/2002 | Kimata | G01J 5/20 250/332 |
| 8,431,900 | B2 * | 4/2013 | Onakado | H04N 5/33 250/338.4 |
| 2008/0251721 | A1 * | 10/2008 | Ueno | G01J 5/08 250/332 |

FOREIGN PATENT DOCUMENTS

JP        2006-33036 A    2/2006

* cited by examiner

*Primary Examiner* — Seung C Sohn
(74) *Attorney, Agent, or Firm* — Canon U.S.A., Inc. IP Division

(57) ABSTRACT

An imaging apparatus includes sensor arrays each having a plurality of subarrays having a plurality of sensors which output signals based on radiation or light, and a plurality of temperature sensors which output signals based on temperatures of the sensor arrays. In this case, a signal output from one subarray of the plurality of subarrays and a signal of one temperature sensor of the plurality of temperature sensors are read out through a line to which the sensor included in the one subarray and the one temperature sensor are commonly connected.

14 Claims, 9 Drawing Sheets

IMAGING APPARATUS WITH TEMPERATURE SENSORS, IMAGING SYSTEM AND IMAGING METHOD

BACKGROUND OF THE INVENTION

Field of the Invention

The present invention relates to an imaging apparatus having an image pickup element and particularly relates to improved image quality of an image captured thereby.

Description of the Related Art

An imaging apparatus may include a CCD or a CMOS image sensor as a sensor for detecting radiation. A characteristic of such a sensor is influenced by a change in temperature of a sensor array itself having the sensor or in temperature of a peripheral circuit for operating the sensor. Because such a change in temperature results in a change in dark current of the sensor, a difference occurs between an image and an offset value due to the dark current, deteriorating the image quality of the resulting radiographic image.

Japanese Patent Laid-Open No. 2006-33036 discloses a method for correcting such dark current by providing a plurality of temperature sensors in a plurality of subarrays in a sensor array (CMOS image sensor) and changing a correction value for dark current in accordance with values of the temperature sensors.

However, in an imaging apparatus disclosed in Japanese Patent Laid-Open No. 2006-33036, it is complicated to associate data of a plurality of subarrays and data of a plurality of temperature sensors, which may possibly further complicate data processing for the correction.

Accordingly, the present invention provides an imaging apparatus including a plurality of temperature sensors and a plurality of subarrays, which allows easy association of data of subarrays and data of temperature sensors.

SUMMARY OF THE INVENTION

The present invention provides an imaging apparatus includes sensor arrays each having a plurality of subarrays having a plurality of sensors which output signals based on radiation or light, and a plurality of temperature sensors which output signals based on temperatures of the sensor arrays, wherein a signal output from one subarray of the plurality of subarrays and a signal of one temperature sensor of the plurality of temperature sensors are read out through a line to which the sensor included in the one subarray and the one temperature sensor are commonly connected.

Further features of the present invention will become apparent from the following description of exemplary embodiments with reference to the attached drawings.

DESCRIPTION OF THE EMBODIMENTS

First Exemplary Embodiment

Figure 1:
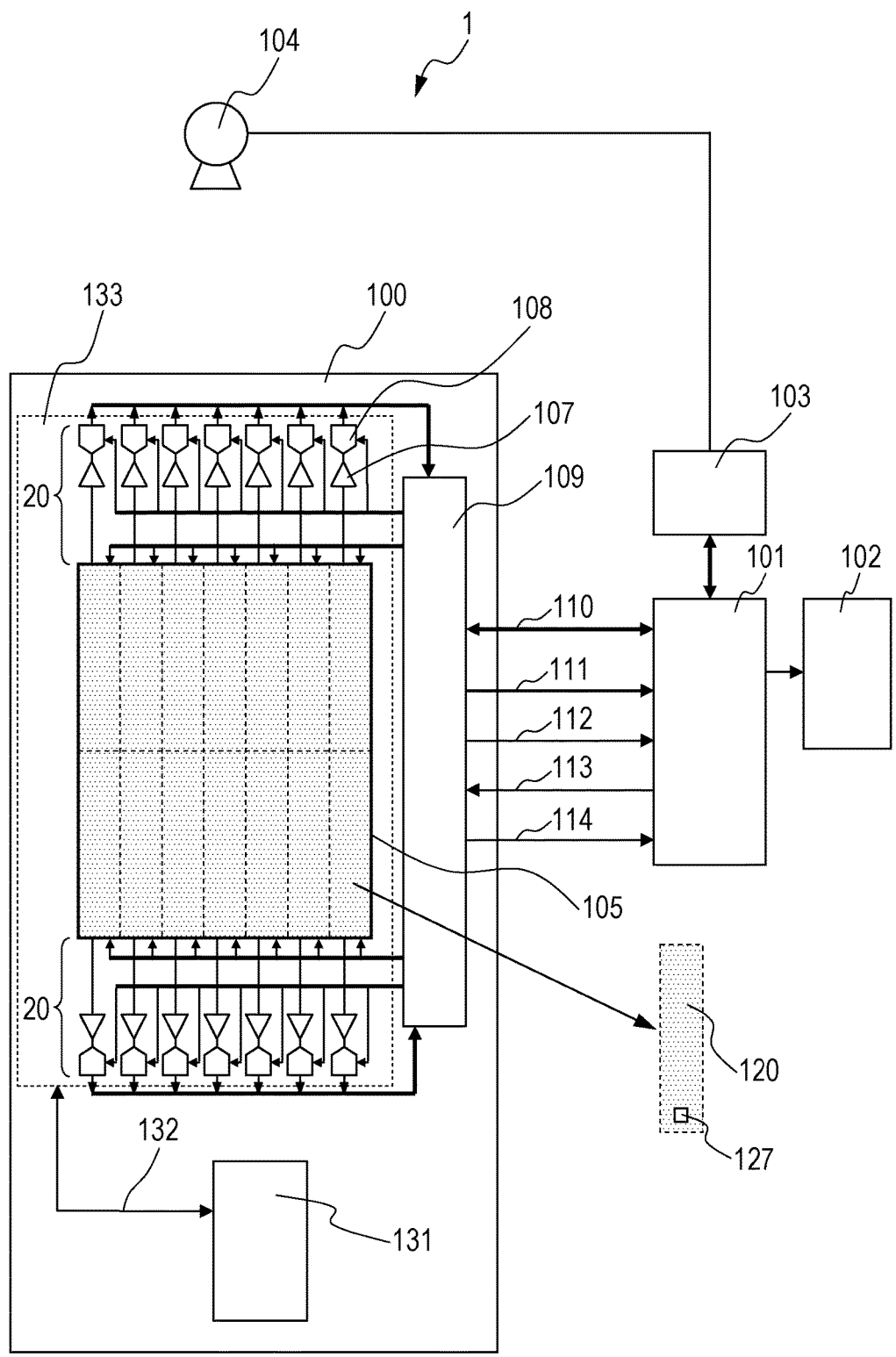
FIG. 1 is a block diagram illustrating a radiation imaging system according to a first exemplary embodiment.

FIG. 1 illustrates an example of a block diagram illustrating a radiation imaging system according to a first exemplary embodiment of the present invention.

First, an overall configuration of the radiation imaging system will be described with reference to FIG. 1. FIG. 1 illustrates an example of a block diagram of the radiation imaging system according to the first exemplary embodiment.

A radiation imaging system 1 includes a radiation imaging apparatus 100, a processing unit 101 configured to perform image processing and system control, a displaying unit 102 configured to display, a radiation control unit 103, and a radiation source 104 which emits radiation. For performing a radiation imaging operation, the processing unit 101 is capable of performing synchronism control over the radiation imaging apparatus 100 and the radiation control unit 103. Radiation (such as an X-ray, an α ray, a β ray, and γ ray) passed through a subject is detected by the radiation imaging apparatus 100 and undergoes a predetermined process in the processing unit 101, for example. As a result, image data of the subject is generated. Image data are displayed as a radiographic image on the displaying unit 102. The radiation imaging system 1 according to this exemplary embodiment corresponds to an imaging system according to the present invention.

Next, an overall configuration of the radiation imaging apparatus 100 will be described. The radiation imaging apparatus 100 according to this exemplary embodiment has a sensor array 105 and a plurality of temperature sensors 127. The sensor array 105 has a plurality of subarrays 120. Each of the subarrays 120 has a plurality of sensors configured to output signals based on radiation or light. The temperature sensors 127 output signals based on a temperature of the sensor array 105. A signal output from one subarray 120 of the plurality of subarray 120 and a signal from the corresponding temperature sensor 127 in the one subarray are read out through a common line. The radiation imaging apparatus 100 according to this exemplary embodiment corresponds to an imaging apparatus according to the present invention. These components will be described in detail below.

The sensor array 105 includes the plurality of subarrays 120 tiled (two-dimensionally arranged) on a planer base. Formation of a large sensor array 105 may be achieved by the configuration. Each of the subarrays 120 has a plurality of sensors. Having described above a semiconductor substrate is tiled such that the subarray 120 may have seven columns by two rows, for example, an embodiment of the present invention is not limited to the configuration. According to this exemplary embodiment, the subarray 120 is one region of a plurality of divided regions of a region where a plurality of sensors are placed in the sensor array 105. The plurality of divided regions are placed adjacently to each other. Therefore, one subarray 120 may be defined on tiled semiconductor substrates, or a plurality of subarrays 120 may be defined within the semiconductor substrate. The following description assumes that the subarray 120 is a region divided for each one semiconductor substrate in the sensor array 105.

A scintillator (not illustrated) configured to convert radiation to light, for example, is provided on the subarrays 120. A plurality of photoelectric conversion elements (sensors) are placed on a side to which radiation enters and the opposite side of the scintillator. Each of the sensors may be a conversion element configured to perform MIS type or PIN type photoelectric conversion. Thus, an electric signal based on an irradiated dosage. In other words, according to this exemplary embodiment, a conversion element configured to generate charges based on radiation may include such a sensor and a scintillator corresponding thereto. The conversion element may directly convert radiation to charges.

The driving unit 210 includes a row scanning circuit 203 and a column scanning circuit 204, which will be described below.

A signal reading unit 20 at least has a signal amplification unit 107 including a differential amplifier, for example, and an AD converting unit 108 configured to perform analog-digital conversion (AD conversion). The signal reading unit 20 is capable of reading a signal of a sensor selected in the row scanning circuit 203 and column scanning circuit 204, which will be described below. The sensor array 105 has a plurality of electrodes for signal input/output or power supply on its upper side and lower side. The electrodes may be connected to an external circuit by using a flying lead type printed wiring board (not illustrated), for example. Then, signals from the subarray 120 are read out by the signal reading unit 20 through the electrodes. A control signal from a control unit 109 is input to the subarray 120 through the electrodes.

The control unit 109 is configured to exchange a control command and a synchronism signal with the processing unit 101 and output image data to the processing unit 101. The control unit 109 may control the subarray 120 or a unit for drive control and operation mode control over the sensors and temperature sensors. The control unit 109 synthesizes image data (digital data) of the subarrays 120, which are AD converted by the AD converting unit 108 in the signal reading unit 20 into one frame data set and outputs the frame data set to the processing unit 101. Furthermore, the control unit 109 is capable of controlling so as to read temperature data for each one frame from the temperature sensors 127 in a period for reading signals from the sensors 202 to be read for one frame in the subarray 120. The control unit 109 is capable of calculating a temperature of the sensor array 105 or an amount of change in temperature of the sensor array 105 from the acquired data of the temperature sensor 127.

The processing unit 101 is capable of performing an offset correction by subtracting frame data for offset from the acquired frame data set. The subarray 120 generates dark current also in a period when radiation for imaging is not irradiated. Thus, the subarray 120 has an offset value in image data. The processing unit 101 has image data acquired without irradiation of radiation in a predetermined period as frame data for offset for the subarray 120. Then processing unit 101 is capable of performing an offset correction by subtracting the frame data for offset from image data acquired in a different period from the predetermined period.

The processing unit 101 may prepare offset correction data for the sensor array 120 in association with temperature data. In a case where a plurality of sensor arrays 120 are provided, each of the sensor arrays 120 may have the offset correction data. The processing unit 101 may select offset correction data based on temperature data for performing an offset correction. Thus, an offset correction may be performed on image data in accordance with the temperature of the sensor array 120.

A control command or a control signal and image data may be exchanged through interfaces between the control unit 109 and the processing unit 101. The processing unit 101 outputs setting information and imaging information such as an operation mode and parameters to the control unit 109 through a control interface 110. The control unit 109 outputs device information such as an operating state of the radiation imaging apparatus 100 to the processing unit 101 through the control interface 110. The control unit 109 outputs image data acquired by the radiation imaging apparatus 100 to the processing unit 101 through an image data interface 111. The control unit 109 uses a READY signal 112 to notify the processing unit 101 on that the radiation imaging apparatus 100 is become ready for imaging. The processing unit 101 uses an external synchronism signal 113 to notify a time point for starting irradiation (exposure) of radiation to the control unit 109 in response to the READY signal 112 from the control unit 109. The control unit 109 outputs a control signal to the radiation control unit 103 to start radiation irradiation during a period when an exposure permission signal 114 is enabled.

The temperature sensor 127 is provided in each of the subarrays 120 in order to acquire a temperature of the sensor array 105. The temperature sensor 127 and the subarray 120 are connected by a common line. Illustrating the temperature sensor 127 at an end of the surface, an embodiment of the present invention is not limited thereto. The temperature sensor 127 may be placed at any position on a surface of the subarray 120 as far as radiation or light does not launch thereon. At least, the subarray 120 and temperature sensor 127 are placed on a common semiconductor substrate. Furthermore, the temperature sensor 127 may be placed on a region different from a region having the subarray 120 on the semiconductor substrate. The configuration placed on a common semiconductor substrate may include a configuration in which the subarray 120 and the temperature sensor 137 are placed on a common semiconductor substrate.

A cooling panel 133 has a function for cooling the sensor array 105. It allows less change in temperature of the sensor array 105 and may prevent fluctuations of a characteristics of the sensor array. The cooling panel 133 contains a substance having high thermal conductivity so that the entire surface of the sensor array 105 may have a uniform temperature.

A cooling device 131 has a function for controlling so as to keep the temperature of the cooling panel 133 at a constant temperature. A cooling hose 132 is connected to the cooling device 131 and the cooling panel and has a function as a path for causing a coolant to circulate. The cooling device 131 causes a temperature-managed coolant to circulate to keep it at 27° C.

Figure 2:
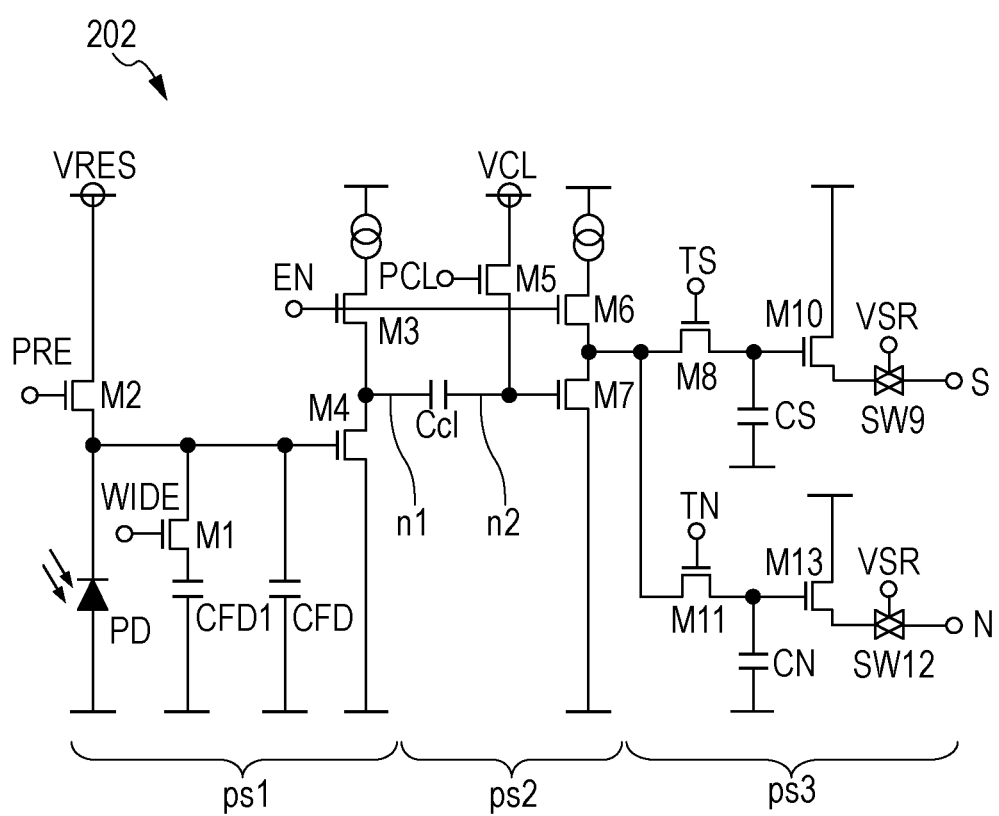
FIG. 2 illustrates a sensor according to the first exemplary embodiment.

Next, an example of the sensors will be described with reference to FIG. 2. FIG. 2 is an equivalent circuit diagram illustrating an example of a circuit configuration of sensors 202 for one subarray 120.

As illustrated in FIG. 2, each of the plurality of sensors may include a first part ps1, a second part ps2, and a third part ps3, for example. The conductions of transistors M1 to M13 provided in the parts may be controlled by the control unit 109.

The first part ps1 may have a photodiode PD, transistors M1 to M3, a floating diffusion capacitance CFD (hereinafter, called an FD capacitance CFD), a sensitivity switching capacitance CFD1. The photodiode PD is a photoelectric conversion element and is capable of generating charges based on radiation or light. The photodiode PD converts light caused in the scintillator based on irradiated radiation to an electric signal. The photodiode PD is capable of directly detecting radiation and generating charges. The amount of charges based on the radiation or light occurs in the photodiode PD, and the voltage of the FD capacitance CFD based on the occurring amount of charge is output to the second part ps2. The sensitivity changing capacitance CFD1 is used for changing the sensitivity for radiation to the sensor 202 and is connected to the photodiode PD through the transistor M1 (switch element). The control unit 109 activates a WIDE signal to bring the transistor M1 into conduction and voltage for the added capacitance of the FD capacitance CFD and the capacitance CFD1 is output to the second part ps2. Thus, in the sensor 202, the sensitivity for radiation is changed based on whether the capacitance CFD1 is used or not. The transistor M2 initializes charges in the photodiode PD in response to activation of a PRES signal and resets voltage to be output to the second part ps2. In a case where such a sensitivity changing function is not provided, M1 and CFD1 are not included in the first part ps1.

The second part ps2 may have transistors M3 to M7, a clamp capacitance CCL, and a constant current source. The transistor M3, transistor M4 and constant current source (such as current mirror transistor) are serially connected to form an electric current path. The control unit 109 activates an enable signal EN input to a gate of the transistor M3 to shift the transistor M4 which receives voltage from the first part ps1 to an operating state. Thus, a source follower circuit is formed, and voltage based on voltage from the first part ps1 is output. In the following stage, a clamp circuit including transistors M5 to M7 and a clamp capacitance CCL is provided. More specifically, the clamp capacitance CCL has one terminal n1 connected to a node between the transistor M3 and the transistor M4 in the first part ps1, and the other terminal n2 is connected to the transistor M5 functioning as a clamp switch. The transistor M6, transistor M7, and constant current source are connected directly to form an electric current path, and the other terminal n2 is connected to a gate of the transistor M7. This configuration allows reduction of an influence of kTC noise (what-is-called reset noise) occurring in a photodiode PD of the first part ps1. More specifically, voltage based on voltage from the first part ps1 upon reset as described above is input to the terminal n1 of the clamp capacitance CCL. Activation of a clamp signal PCL brings the transistor M5 into conduction, and clamp voltage VCL is input to the terminal n2 of the clamp capacitance CCL. Thus, the potential of the terminal n2 is clamped as a noise component, and an amount of change of voltage rue to occurrence and storage of charges in the following photodiode PD is output as a signal component. An enable signal EN is input to a gate of the transistor M6, and an enable signal EN is thus activated so that the transistor M7 is shifted to an operating state. Thus, a source follower circuit is formed, and voltage based on gate voltage of the transistor M7 is output to the third part ps3.

The third part ps3 may have transistors M8, M10, M11, and M13, analog switches SW9 and SW12, and capacitances CS and CN. The third part ps3 corresponds to a holding unit according to the present invention. The holding unit has a signal holding unit and a reference signal unit. The signal holding unit has a function for holding a signal based on the amount of charge occurring in the photoelectric conversion element. More specifically, the signal holding unit has the transistors M8 and M10, switch SW9, and capacitance CS. The reference signal unit has a function for holding a reference signal which is a reference for an occurring amount of charge. More specifically, the holding unit has the transistors M9 and M11, switch SW12, and capacitance CN.

The transistor M8 and the capacitance CS for a sample-and-hold circuit, which functions as a signal holding unit configured to hold an output level from the second part ps2. First, an operation for holding a signal in the signal holding unit will be described. More specifically, the control unit 109 uses a control signal TS1 to change the state (into conduction or non-conduction) of the transistor M8 so that a signal (based on a light component) acquired from the second part ps2 may be held or sampled in the capacitance CS. The transistor M10 functions as an amplifier by performing its source follower operation and thus amplifies a given signal. The amplified signal uses a control signal VSR to bring the analog switch SW9 into conduction and is output from a terminal S. Next, an operation will be described in which a reference holding unit holds a reference signal. The transistors M11 and M13, analog switch SW12 and capacitance CN are also capable of holding a reference signal.

Figure 3:
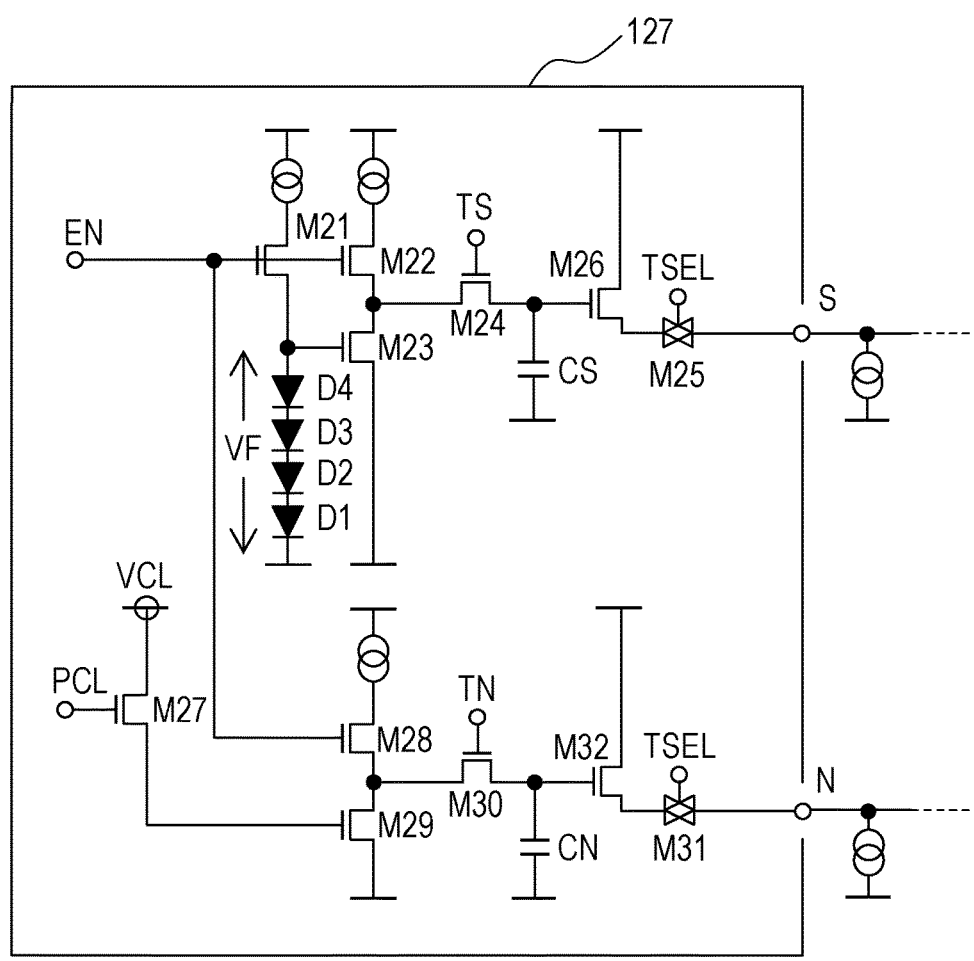
FIG. 3 illustrates a temperature sensor according to the first exemplary embodiment.

Next, a configuration of a temperature sensor according to the first exemplary embodiment will be described in detail with reference to FIG. 3. FIG. 3 illustrates an example of a configuration of a temperature sensor according to the first exemplary embodiment.

First, an overall configuration of the temperature sensor will be described. The temperature sensor 127 in FIG. 3 includes at least one or a plurality of diodes. The temperature sensor 127 further includes a signal amplification unit configured to amplify a signal of the diode and a signal holding unit configured to hold a signal output from the signal amplification unit. The temperature sensor 127 further includes a reference holding unit configured to hold a reference signal which is a reference for a temperature of the subarray 120. The temperature sensor 127 further includes a second signal amplification unit configured to amplify a reference signal which is a reference for a temperature of the subarray 120 and a reference holding unit configured to hold a signal output from the second signal amplification unit. These components will be described more specifically.

First, diodes in the temperature sensor 127 will be described. Diodes D1 to D4 configured by PN junction are provided. The diodes contain a silicon semiconductor. It is assumed that the following forward voltage and temperature characteristics are produced in a case where a PN junction diode containing a silicon semiconductor is used. A relationship between a current I fed to the PN junction diode and voltage V applied thereto is expressed by the following expression (1):

$$I = Io(\exp(qV/nkT) - 1)) \qquad (1)$$

Here, q is a unit charge, n is an ideal factor, k is a Boltzmann constant, T is a temperature, Io is a saturation current. In an example of a characteristics based on Expression (1), the PN junction diode functions as a temperature sensor having a forward voltage characteristic of about 0.6 V at a normal temperature and the forward voltage has a temperature characteristic off about −2.5 mV/° C. According to this exemplary embodiment, the four diodes are serially connected and have a forward voltage of about 2.4 V at a normal temperature and an output characteristic of about −10 mV/° C. Because the output of the temperature sensor can fall within an equivalent output range to that of the sensor illustrated in FIG. 2, the signal reading unit 20 illustrated in FIG. 1 may be used to read out, like the sensor 202.

Next, the signal amplification unit will be described. The signal amplification unit includes at least one transistor (M23). A transistor M23 operates as a source follower and has a function for performing signal amplification on a signal based on forward voltage VF of the diode output from the temperature sensor as a temperature signal S.

Next, the second signal amplification unit will be described. A transistor M29 as the second signal amplification unit operates as a source follower and has a function for performing signal amplification on a reference signal VCL output from an N terminal of the temperature sensor as a reference signal N.

Next, the signal holding unit will be described. The signal holding unit at least includes a transistor M24 and a capacitance CS to configure a sample-and-hold circuit for a temperature sensor signal. The transistor M24 is for sampling and holding (sampling and holding switch S). The capacitance CS is a hold capacitance for a temperature sensor signal. The signal holding unit may further has a transistor M26 for signal amplification. The transistor M26 operates as a source follower and functions as an amplification transistor for a temperature sensor signal.

Next, a reference holding unit will be described. The reference holding unit at least includes a transistor M30 and a capacitance CN to configure a sample-and-hold circuit for reference signal storage. The transistor M30 is a sampling and holding transistor (sampling and holding switch N). The capacitance CN is a hold capacitance for a reference signal. The reference holding unit may further has a transistor M32 for signal amplification. The transistor M32 operates as a source follower and functions as a transistor for amplification of a reference signal.

Next, a transfer switch will be described. The transistor M25 is a transfer switch S for outputting a temperature sensor signal amplified in the transistor M26 to an S-signal output line. The transistor M31 is a transfer switch N for outputting a reference signal amplified in the transistor M32 to an N signal output line.

Next, signals relating to control over the temperature sensors 127 and operations based on the signals will be described. The signals, which will be described below, are input from the control unit 109.

First, a signal EN will be described. An signal EN has a function for controlling operating states of the transistors input from the control unit 109. The signal EN is connected to gates of a constant current select switch (M21) for a diode, a constant current select switch (M22) for a diode signal amplifier, a constant current select switch (M28) for a reference voltage amplifier. When the signal EN has a high level, the select switches M21, M22, and M28 are turned on. When the signal EN has a high level, constant current is fed to serially connected diodes D1 to D4, and a signal based on forward voltage VF of the diodes is output from the transistor M23 having shifted to an operating state as a signal output from the temperature sensor.

A PCL signal is a signal for controlling a reference voltage select switch M27. When the signal EN has a high level and the PCL signal comes to have a high level, the reference voltage select switch M27 is turned on, and the reference signal VCL is amplified and is output from the transistor M29 shifted to an operating state.

A signal TS is a sampling and holding control signal for signal output of the temperature sensor. The signal TS is shifted to a high level and the transistor M24 is turned on so that the forward voltage VF of the diode may be applied to the capacitance CS through the M23. Next, the signal TS is shifted to a low level and the transistor M24 is turned on so that the holding of a temperature sensor signal to the sample-and-hold circuit completes.

A signal TN is a sampling and holding control signal for the reference signal VCL. The signal TN is shifted to a high level and the transistor M30 is turned on so that the amplified reference signal VCL is applied to the capacitance CN through the transistor M29. Next, the signal TN is shifted to a low level and the transistor M30 is turned off so that holding of the reference signal VCL in the sample-and-hold circuit completes.

After the sampling and holding of the capacitance CS and capacitance CN, the transistors M26 and M32 are turned on so as to allow non-invasive reading of the held signal until sampling and holding is performed again.

A signal TSEL is a temperature sensor select signal and controls ON/OFF states of the transfer switch S (M25) and transfer switch N (M31). A signal S of temperature sensor signal hold capacitance (CS) and a signal N of a reference voltage VCL hold capacitance (CN) are output.

Figure 5:
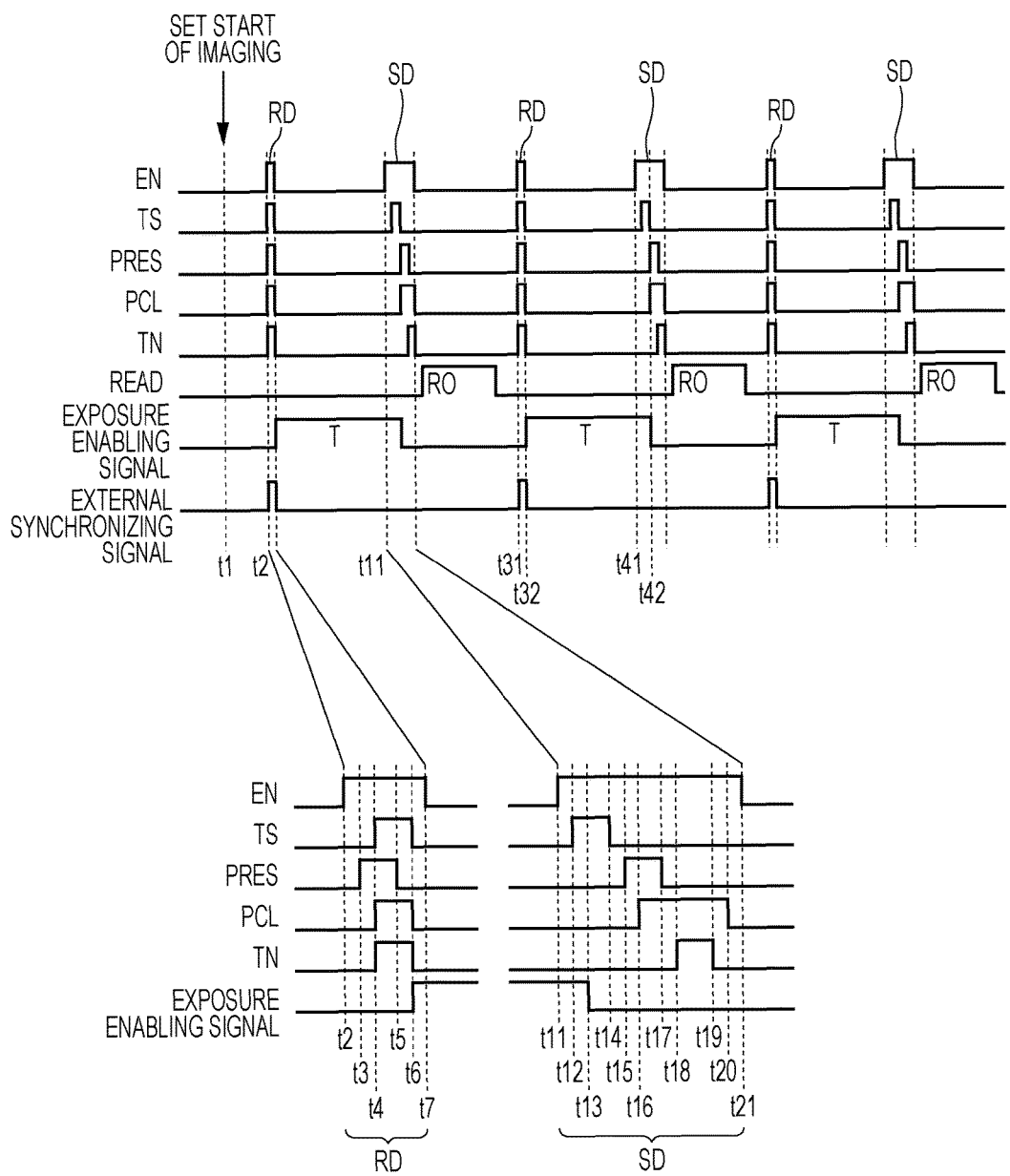
FIG. 5 is a timing chart illustrating time points for reading a signal from a sensor array according to the first exemplary embodiment.

In the temperature sensor 127 of this exemplary embodiment, diodes are not energized at all times but are discretely energized as illustrated in FIG. 5, which will be described below.

Figure 4:
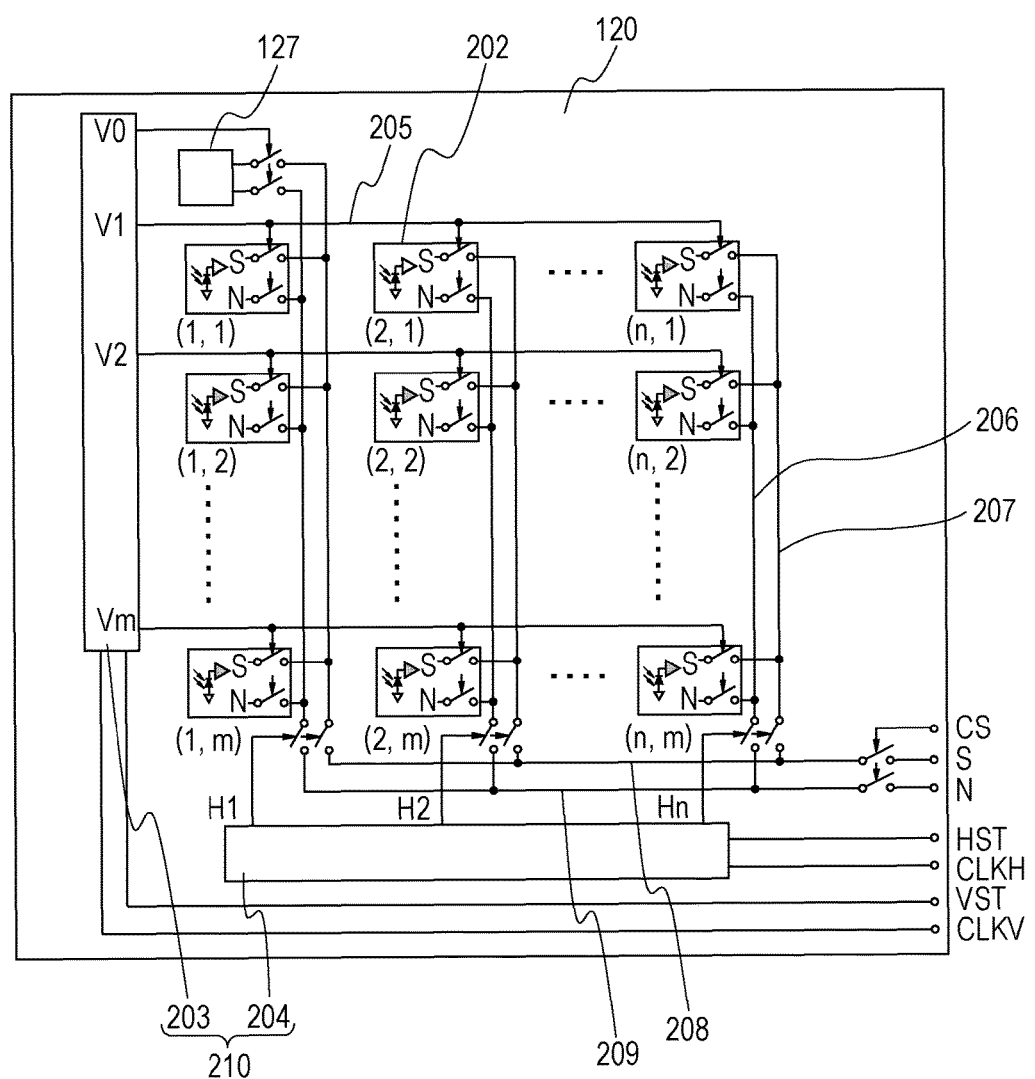
FIG. 4 illustrates a subarray according to the first exemplary embodiment.

The subarray 120 according to the first exemplary embodiment will be described with reference to FIG. 4. FIG. 4 illustrates a configuration example of the subarray 120. As illustrated in FIG. 4, the subarray 120 has a plurality of sensors 202 including m sensors 202 in a longitudinal direction on a long side and n sensors 202 in a lateral direction on a short side. The subarray 120 has the plurality of sensors in a matrix. According to this exemplary embodiment, one of column signal lines 206 and 207 is used commonly between the temperature sensor 127 and the subarray.

Signals of the subarray 120 and the temperature sensor 127 are read out by the signal reading unit 20 through the common line. According to this exemplary embodiment, a row scanning circuit is further provided which scans the plurality of sensors of the subarray 120 row by row. The row scanning circuit commonly scans sensors and temperature sensors of a predetermined row.

The driving unit 210 has a row scanning circuit 203 configured to drive the sensors 202 and a column scanning circuit 204 configured to read signals from the sensor 202.

The row scanning circuit 203 and column scanning circuit 204 may be shift registers, for example, and operate based on control signals from the control unit 109. The row scanning circuit 203 inputs a control signal to each of the sensors 202 through a row signal line 205 and drives the sensors 202 row by row based on the control signal. For example, the row scanning circuit 203 functions as a row selection unit and selects a plurality of sensors 202 from which signals are to be read row by row on a predetermined selection cycle. The column scanning circuit 204 functions as a column selection unit and selects the sensors 202 column by column based on a control signal and causes the sensors 202 to sequentially output signals on a predetermined read-out cycle. When a row selection signal V0 is enabled, the temperature sensor 127 outputs to a reference signal output terminal N and a signal output terminal S. The selection signal V0 is for a row dedicated to a temperature sensor.

The subarray 120 further has input terminals VST, HST, CLKV, and CLKH. The input terminal VST is a terminal to which row scanning start signal VST. The input terminal CLKV is a terminal to which a row scanning clock signal CLKV is input. The input terminal CLKH is a terminal to which a column scanning clock signal CLKH is input. The input terminal HST is a terminal to which a column scanning start signal HST is input.

The row scanning circuit 203 selects a plurality of sensors in row units and sequentially scans the sensors in a row direction which is a sub-scanning direction in synchronism with a row scanning clock CLKV. The column scanning circuit 204 sequentially selects a column signal line for sensors of a row selected by the row scanning circuit 203 for each one sensor in synchronism with the column scanning clock signal CLKH. The row signal line 205 which is an output line of the row scanning circuit 203 is enabled so that a signal and a reference signal are output through the column signal lines 206 and 207. The signals output to the column signal lines 206 and 207 are sequentially selected by the column scanning circuit 204 so that signals of the sensors are sequentially output to analog voltage output lines 208 and 209.

The subarray 120 has a chip select terminal CS, a signal output terminal S, and a reference signal output terminal N. The chip select terminal CS is a terminal for shifting to a state that a signal is allowed to be read from the subarray 120. The signal output terminal SIG is a terminal configured to read a signal held in the capacitance CS of each of the sensors 202, and the reference signal output terminal N is configured to read a signal held in the capacitance CN.

The sensor 202 in a moving image capturing mode, which is an example of operation mode, and a driving method for a temperature sensor will be described with reference to FIG. 5. A case that the sensor 202 is to be driven will be described. The same driving method may be applied to read signals from a temperature sensor. In the following driving method, signals having the same names in FIGS. 2 and 3 are driven in the same timing.

First, referring to FIG. 5, at a time t1, an operation mode and start of imaging are set. After that, at a time t2, driving for imaging is started, and reset driving RD and sampling driving SD are alternately repeated. After the sampling driving SD and before the next reset driving RD, a read operation RO which reads signals from the subarray 120 is performed.

In the reset driving RD, a reset operation and an operation for clamping an output component in resetting as a noise component are performed. More specifically, as illustrated in FIG. 5, at the time t2, the enable signal EN is shifted to a high level to bring the transistors M3 and M6 into conduction. Thus, the transistors M4 and M7 are ready for performing a source follower operation.

At a time t3, signals PRES and WIDE (not illustrated) are shifted to a high level to bring the transistor M1 for changing sensitivity into conduction and thus bring the transistor M2 for resetting into conduction. Thus, the photodiode PD is connected to the reference voltage VRES, and the photodiode PD is reset. The voltage of the capacitance CFD1 and capacitance CFD are also reset. Voltage based on gate voltage of the transistor M4 immediately after reset is input to one terminal n1 (terminal on the transistor M4 side) of the clamp capacitance CCL.

At a time t4, the signal PCL is shifted to a high level, and the transistor M5 for performing the clamp is brought into conduction. Thus, the clamp voltage VCL is input to the other terminal n2 (terminal on the transistor M7 side) of the clamp capacitance CCL. At a time t4, the signals TS and TN are shifted to a high level to bring the transistor M8 for performing the sampling into conduction. Thus, both of the capacitances CS and CN are returned to their initial states (voltage corresponding to the output level of the second part ps2 when the gate voltage of the transistor M7 is reference voltage VCL).

At a time t5, the signals PRES and WIDE (not illustrated) are shifted to a low level to bring the transistors M1 and M2 into non-conduction. Thus, the capacitance CFD1 and capacitance CFD are fixed with voltage immediately after reset because the transistor M1 is brought into non-conduction. The terminal n1 of the clamp capacitance CCL is set to voltage based on gate voltage of the transistor M4 immediately after reset.

At a time t6, the signal PCL is shifted to a low level to bring the transistor M5 into non-conduction. Thus, charges based on a potential difference between the terminal n1 and the terminal n2 (potential difference between voltage based on reference voltage VRES and reference voltage VCL) are held in the clamp capacitance CCL, and clamping of the kTC noise completes. At the time t6, the signals TS and TN are shifted to a low level to bring the transistors M8 and M11 into non-conduction. Thus, voltages of the capacitances CS and CN are fixed. At the time t6, the exposure permission signal 114 is shifted to a high level (permission state). After that, in the photodiode PD, charges occur and are stored.

At a time t7, the enable signal EN is shifted to a low level to bring the transistors M3 and M6 into non-conduction. Thus, the transistors M4 and M7 are brought into a non-operating state.

Thus, a series of operations of the reset driving RD completes. In other words, in the reset driving RD, the photodiode PD is reset, and voltage corresponding to kTC noise due to the photodiode PD in the first part ps1 is held in the clamp capacitance CCL, and the capacitances CS and CN are initialized.

The reset driving RD may be performed on all sensor collectively, and the reset driving RD after that (for example, at times t31 to t32) may be performed in the timing as described above. Preventing a difference between control time points may allow data continuity to be maintained between adjacent sensors.

Next, in the sampling driving SD, the sensors 202 are driven, and the resulting signals are held in the capacitance CS. More specifically, at a time t11, the enable signal EN is shifted to a high level to bring the transistors M3 and M6 into conduction so that the transistors M4 and M7 may perform a source follower operation. The transistor M4 has gate voltage (or FD capacitance CFD has voltage) that changes based on the amount of charges generated and stored in the photodiode PD. The voltage based on the changed gate voltage is input to one terminal n1 of the clamp capacitance CCL. As a result, the potential of the terminal n1 changes. The potential change of the other terminal n2 of the clamp capacitance CCL depends on the potential change of the terminal n1. Here, as described above, because the clamp capacitance CCL holds voltage corresponding to kTC noise, the amount of the potential change is output to the third part ps3 as a signal component.

At times t12 to t14, signals of the sensors 202 are held in the capacitance CS. At the time t12, the signal TS is shifted to a high level to bring the transistor M8 into conduction.

Thus, sampling with respect to the output level of the second part ps2 starts. More specifically, the capacitance CS has voltage at an output level of the second part ps2 based on the driving at the time t11 (voltage based on gate voltage of the transistor M7). Next, at the time t13, because the sampling starts at the time t12, an exposure permission signal 114 is shifted to a low level (inhibited state). After that, at the time t14, the signal TS is shifted to a low level to bring the transistor M8 into non-conduction or hold an output level of the second part ps2. More specifically, the capacitance CS has voltage fixed with the output level of the second part ps2.

Next, at a time t15, the signal PRES is shifted to a high level to bring the transistor M2 for resetting into conduction. Thus, the voltage of the FD capacitance CFD and capacitance CFD1 is reset to reference voltage VRES, and the voltage of the terminal n1 is also reset to the same state as that at the time t3.

At a time t16, the signal PCL is shifted to a high level to bring the transistor M5 into conduction, and the clamp voltage VCL is input to the other terminal n2 (on the transistor M7 side) of the clamp capacitance CCL. At a time t17, the signal PRES is shifted to a low level to bring the transistors M1 and M2 into non-conduction. Thus, the capacitance CFD1 and capacitance CFD are fixed with voltage immediately after the resetting, and the terminal n1 of the clamp capacitance CCL is set to voltage based on gate voltage of the transistor M4 immediately after the resetting.

At times t18 to t19, voltage corresponding to thermal noise dependent on the circuit configuration of the second part ps2, 1/f noise, fixed pattern noise such as a difference in temperature and process variations is held in the capacitance CN. At the time t18, the signal TN is shifted to a high level to bring the transistor M11 into conduction. Thus, the capacitance CN is charged and has voltage at an output level of the second part ps2 when the gate voltage of the transistor M7 is the reference voltage VCL. At the time t19, the signal TN is shifted to a low level to bring the transistor M11 into non-conduction. Thus, the voltage of the capacitance CN is fixed. Finally, at a time t20, the signal PCL is shifted to a low level to bring the transistor M5 into non-conduction. At a time t21, the enable signal EN is shifted to a low level to bring the transistors M3 and M6 into non-conduction (so that the transistors M4 and M7 may have a non-operating state).

Thus, a series of operations of the sampling driving SD completes. The sampling driving SD may be performed on all sensors collectively to prevent a difference in control time point between subarrays 120, like the reset driving RD. The signal levels of a high level and a low level are given for illustration purpose, and the signal levels may be inverted in accordance with the system they are applied.

Figure 6:
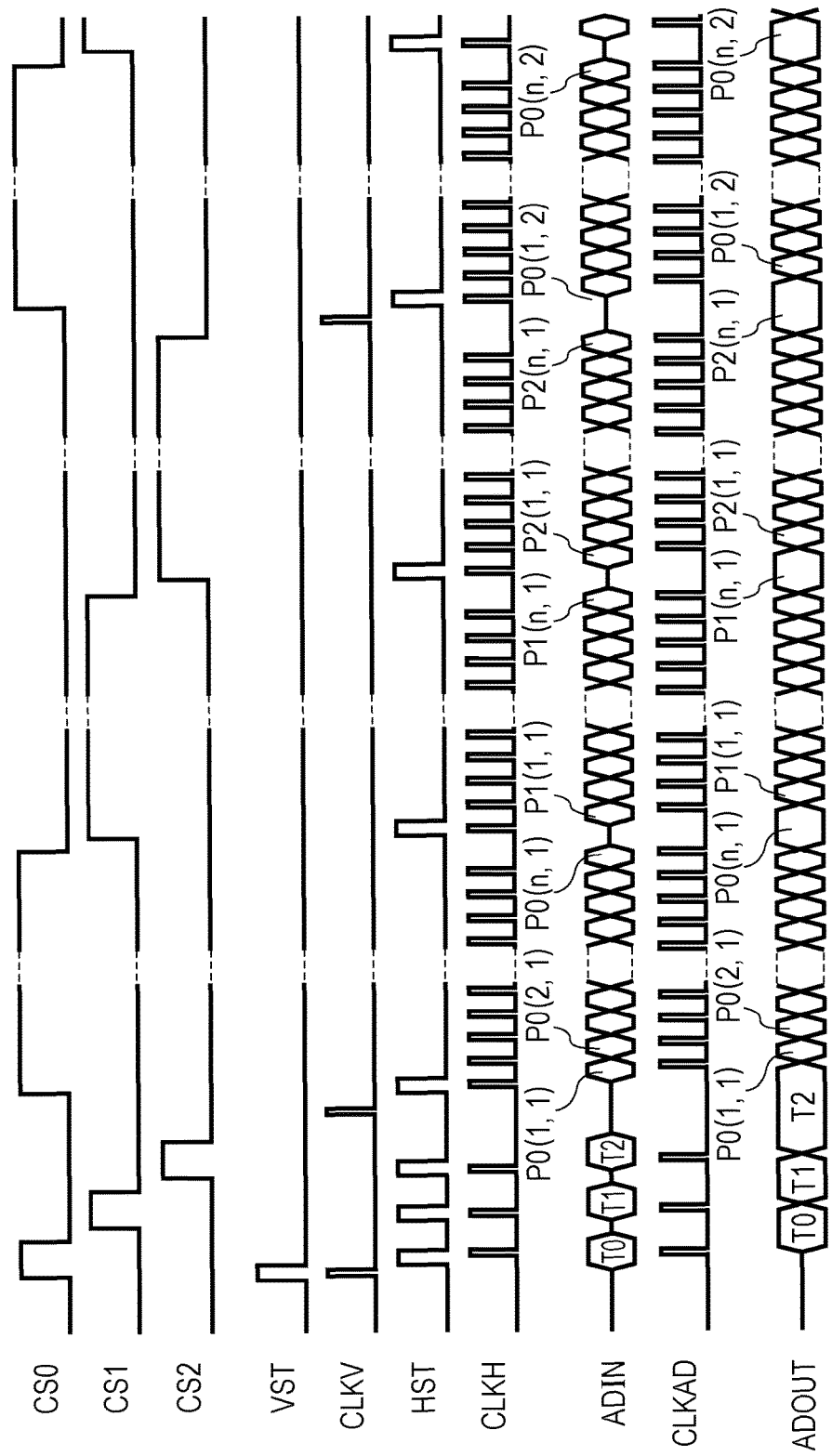
FIG. 6 is a timing chart illustrating time points for reading a signal by one AD converting unit from a plurality of subarrays according to the first exemplary embodiment.

A read-out operation for reading data of the temperature sensor 127 and the subarrays 120 by one signal reading unit 20 in a case where three subarrays 120 are combined will be described with reference to FIG. 6. The read-out operation reads signals from reading target sensors for one frame of the subarray 120 and reads a signal from the temperature sensor 127.

In the sensor array 105, three tiled subarrays 120 are handled as one block, and AD conversion is performed by using the one block as a conversion region for one AD converter in the AD converting unit 108.

First, illustrated signals will be described. A signal CLKH is a synchronism signal for reading out a sensor signal, and a sensor signal outputs of the subarrays 120 are sequentially switched in synchronism with the signal CLKH. A signal CLKAD is an AD clock signal for controlling a time point for performing AD conversion. Signals CS0 to CS2 are used for selecting the subarray 120 to be operated, and the signals CS0 to CS2 are allocated to the three subarrays 120. Thus, output is allowed from the sensor 202 and temperature sensor 127 of the selected subarray 120. A signal ADIN is an output signal from the subarray 120 and is input to the AD converting unit 108. A signal ADOUT is a 16-bit output signal after an AD conversion performed by the AD converting unit 108. Signals VST, CLKV, HST, and CLKH are the same as those in FIG. 4.

The control unit 109 first reads out a signal from the temperature sensor 127 before a signal is read out from the subarray 120. The control unit 109 enables the row selection signal V0 in FIG. 4 in order to acquire data from the temperature sensor 127.

First, the chip select CS0 is enabled, and an output ADIN(T0) of the temperature sensor in the subarray 120 selected by CS0 is input to the AD converter, is AD converted with a CLKAD pulse and is output as ADOUT (T0). After that, in the same manner, the subarrays 120 are selected by CS1 and CS2. Then, the outputs are AD converted in synchronism with CLKAD pulses and are output as ADOUT(T1) and ADOUT(T2). After these steps, signal reading from the plurality of temperature sensors completes. Next, signals are read out from the subarrays 120.

Figure 7:
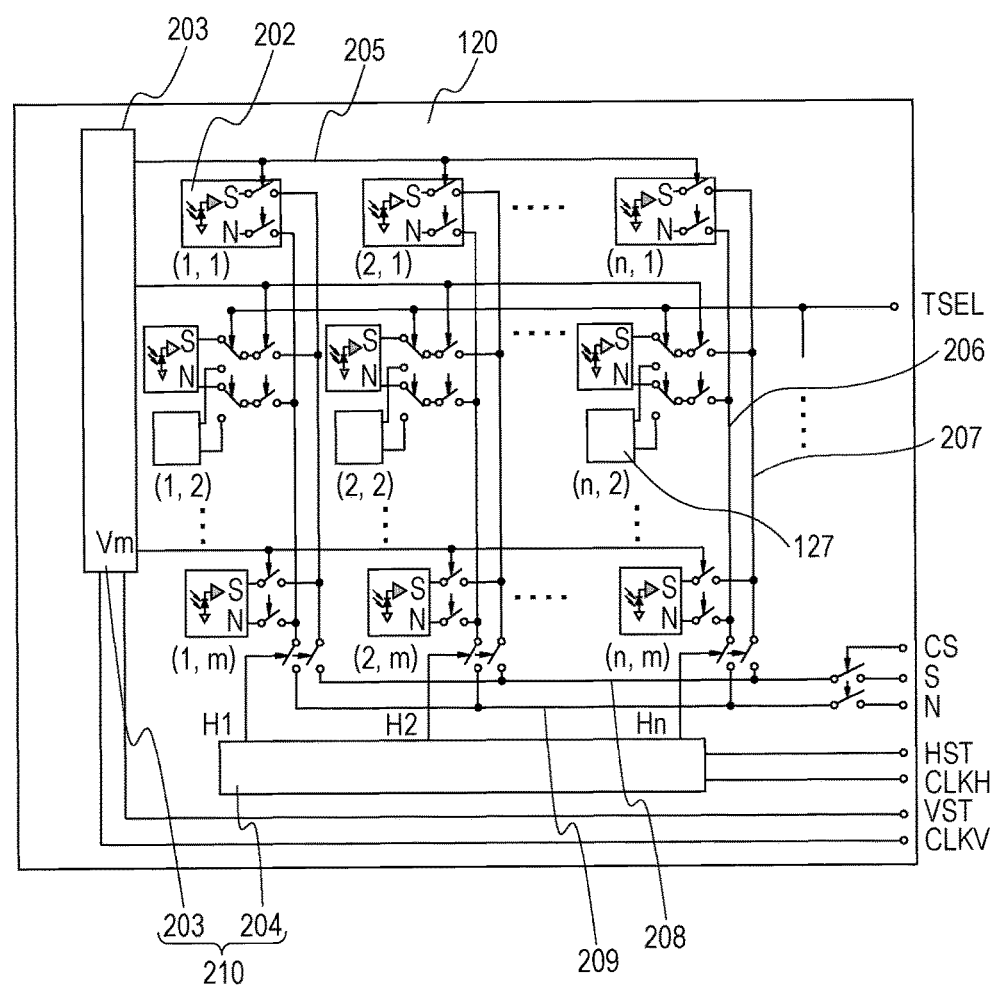
FIG. 7 illustrates a layout of a temperature sensor in an imaging apparatus according to a second exemplary embodiment.

When a row scanning start signal VST has a high state and when the row scanning clock CLKV rises, a row signal line V1 of the row scanning circuit 203 is enabled within the subarray 120. When the row signal line V1 is enabled, outputs from sensor rows P0(1,1) to P2($n$,1) selected by the row signal line V1 and illustrated FIG. 7 are validated.

First, a read out operation for one row of the subarray 120 which is shifted to an operating state by CS0 will be described. First, the chip select CS0 is enabled, and output of the subarray 120 is validated. Within the subarray 120, when the column scanning start signal HST has a high state and when the column scanning clock CLKH rises, a column select row signal H1 of the column scanning circuit 204 is enabled. In synchronism with the rise of the signal CLKH, the column select row signals of the column scanning circuit 204 are switched to H2, . . . , Hn. In synchronism of the signal switching, signals P0(1,1), P0(2,1), . . . P0($n$,1) are sequentially output to ADIN. The sensor signals output to ADIN are AD converted in synchronism with CLKAD pulses. Signals of the sensors are output as ADOUT (P0(1, 1)), ADOUT (P0(2,1)), . . . ADOUT(P0($n$,1)). When the column scanning from P0(1,1) to P0($n$,1) in the subarray 120 completes, the chip select CS0 is disabled. After these steps, the read-out operation for one row of one subarray 120 completes.

Similarly, the chip selects CS1 and CS2 are enabled, and column scanning is performed on P1(1,1) to P1($n$,1) and P2(1,1) to P2($n$,1). Then, the chip selects CS1 and CS2 are disabled. Through these steps, the column scanning for one row of the three subarrays 120 completes.

Next, signal reading performed on second and subsequent rows of each of the subarrays 120 will be described. The control unit 109 inputs CLKV for one pulse to the subarray 120 for controlling so as to enable the row signal line V2 of the row scanning circuit 203. When the row signal line V2 is enabled, outputs from sensor rows P0(1,2) to P2($n$,2) selected by the row signal line V2 and illustrated in FIG. 7 are validated.

Subsequently, the column scanning is repeated on a row of the final sensor from P0(1,$m$) to P2($n$,$m$) by sequentially switching the row signal line of the row scanning circuit 203 in the sensor array 105 up to Vm by using CLKV. Thus, reading from all sensors of the three subarrays 120 completes. Such reading with the CS signals corresponding to the subarrays 120 and the temperature sensor 127 allows easy association between signals of the subarrays 120 and the temperature sensor 127. Having described three subarrays 120 and one AD converter 108, an embodiment of the present invention is not limited thereto. For example, one subarray 120 and one AD conversion 108 may be provided. Four or more subarrays 120 and one AD converter 108 may correspond. Thus, the correspondence between a plurality of subarrays 120 and an AD converter 108 allows association between data of the subarrays and data of the temperature sensor with a simpler circuit configuration.

In this manner, in an imaging apparatus having a temperature sensor, a temperature of the sensor array may be appropriately acquired. In an imaging apparatus having a plurality of temperature sensors and a plurality of subarrays, data of the subarrays and data of the temperature sensors may be associated easily.

The control unit 109 is allowed to change and correct frame data for offset based on the data acquired from the plurality of temperature sensors. For example, a relationship between a relative difference in temperature and frame data for offset may be acquired in advance with reference to offset frame data for normal temperature data of the subarrays. The frame data for offset may be changed as required for the correction. Thus, the imaging apparatus is allowed to perform appropriate offset correction.

Second Exemplary Embodiment

A second exemplary embodiment will be described with reference to FIG. 7. The second exemplary embodiment is different from other exemplary embodiments in that a plurality of temperature sensors are provided in one subarray.

This configuration allows measurement of wide range temperature information within one subarray. Thus, more precise temperature correction may be performed on the sensor array. The second exemplary embodiment will be described in detail.

FIG. 7 illustrates an example of an internal structure of a subarray 120 in a case where the temperature sensor 127 is provided for each of a plurality of sensors.

The subarray 120 of this exemplary embodiment has a plurality of juxtaposed temperature sensors 127. The control unit 109 enables a signal TSEL to switch the output to the signal reading unit 20. Illustrating the temperature sensor 127 juxtaposed with a part of the sensor 202 in FIG. 7, an embodiment of the present invention is not limited thereto. The temperature sensor 127 may be provided for each group of a plurality of rows and columns. A higher number of many temperature sensors 127 than the number of sensors may be provided. This configuration allows detection of a temperature characteristic over the entire subarray 120.

Next, an example of the layout of the temperature sensors 127 according to this exemplary embodiment will be described. According to this exemplary embodiment, the temperature sensors 127 may be placed at the back of the subarray 120 so as not to block radiation or light to the subarray 120. In this configuration, the temperature sensor 127 may be placed between the subarray 120 and the cooling panel 130.

Thus, in an imaging apparatus having the temperature sensors, a wider range temperature of the sensor array may be acquired.

Third Exemplary Embodiment

A third exemplary embodiment will be described with reference to FIGS. 8 and 9. The third exemplary embodiment is different from other exemplary embodiments in that whether a signal based on an amount of change of the temperature of a sensor panel can be read out from the temperature sensor may be determined based on a signal different from a signal for shifting a sensor array to an operating state. This configuration allows supply of voltage to a temperature sensor at an arbitrary time point. Thus, a temperature increase may be detected even when a signal EN to a sensor array is not enabled. The third exemplary embodiment will be described in detail below.

Figure 8:
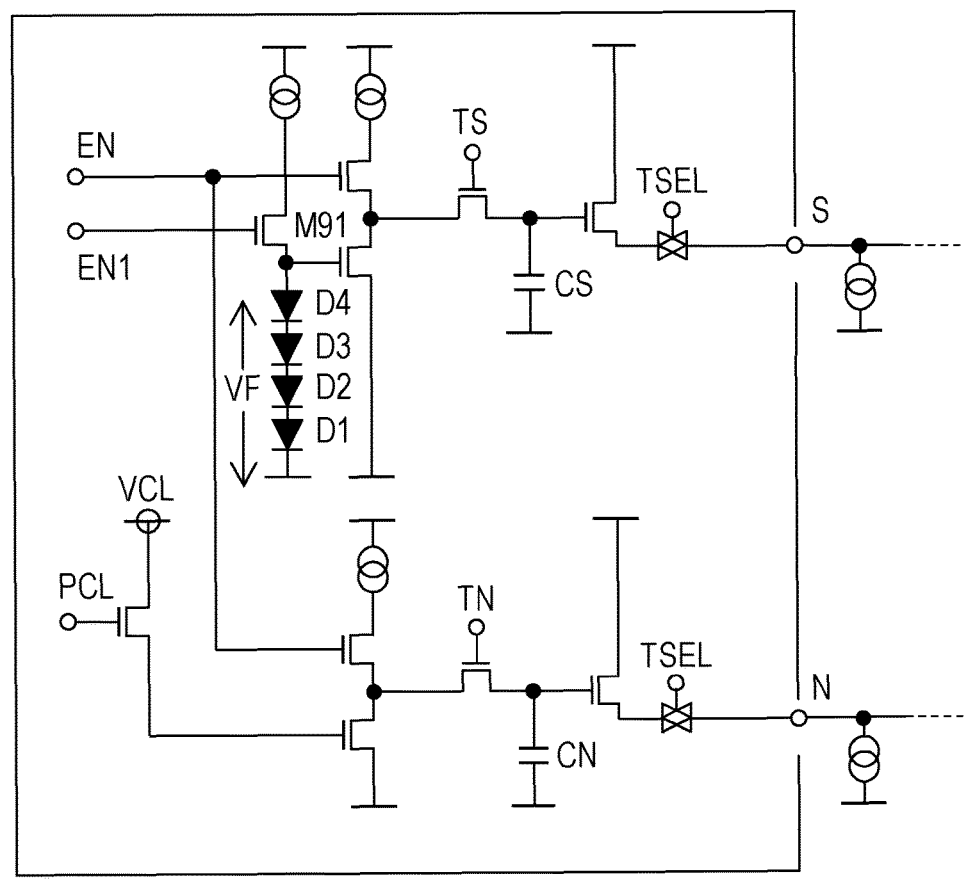
FIG. 8 illustrates a temperature sensor according to a third exemplary embodiment.

FIG. 8 illustrates a temperature sensor which allows control of application of voltage to a diode based on a signal EN different from that for a sensor array. A transistor M91 functions as a switch for restricting voltage application to a diode based on a signal EN1. The control unit 109 is capable of controlling voltage application to a diode when the signal EN1 is asserted (hereinafter, shifted to a high level). On the other hand, the control unit 109 is capable of negating the signal EN1 (hereinafter, shifting to a low level) to control the voltage application.

Figure 9:
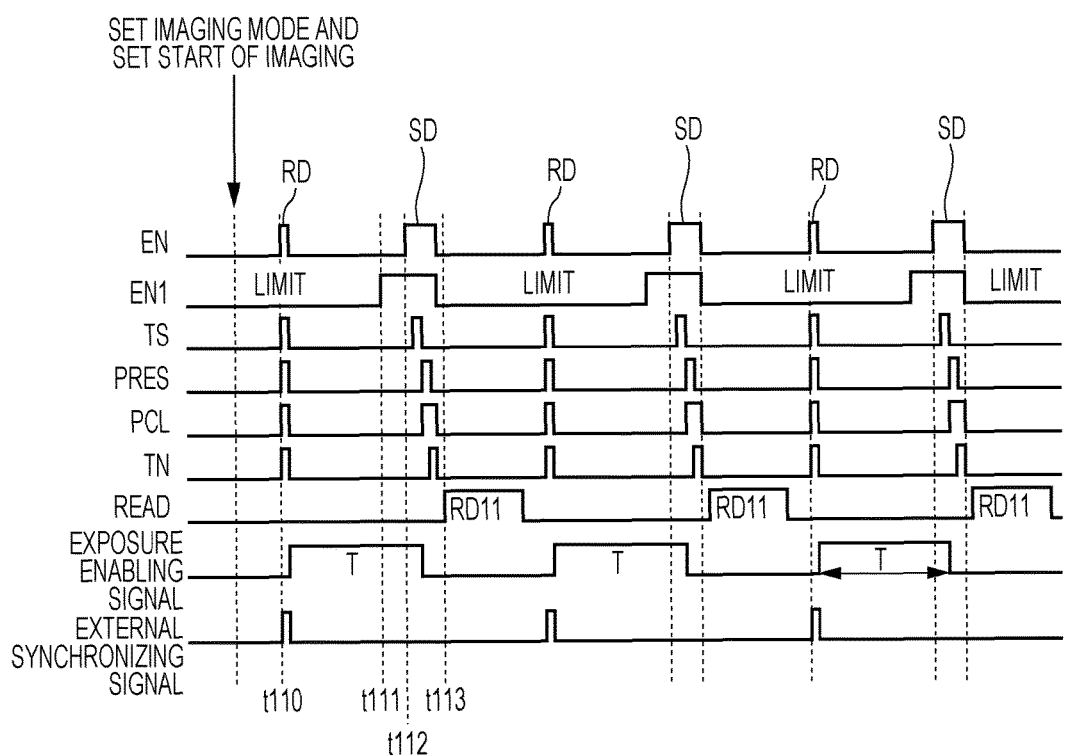
FIG. 9 illustrates time points for reading a signal in an imaging apparatus according to the third exemplary embodiment.

With reference to FIG. 9, an example of timing for driving of reading a signal from the temperature sensor 127 in a case where constant current to the temperature sensor 127 is restricted will be described.

First, the control unit 109 performs reset driving at a time t110. In this case, the signal EN1 is shifted to a low level to restrict driving of the temperature sensor 127. Next, the control unit 109 at a time t111 shifts the signal EN1 to a high level before sampling driving. After that, the control unit 109 performs sampling driving at a time t112, and data read out is started at a time t113. Thus, control of the temperature sensor 127 may be inhibited at the time point for reset driving.

Thus, in an imaging apparatus having a temperature sensor, the temperature sensor is controlled separately from a sensor array while signals may be read out by the same method. Therefore, a signal from the temperature sensor may be read out at a desired time point.

According to an exemplary embodiment of the present invention may be implemented by executing a program (computer program) by a computer or a control computer. A measure for supplying a program to a computer, such as a computer-readable recording medium such as a CD-ROM recording a program or a transmission medium such as the Internet for transmitting a program is also applicable as an exemplary embodiment of the present invention. Such a program is also applicable as an exemplary embodiment of the present invention. A program, a recording medium, a transmission medium and a program product as described above are included in the scope of the present invention. The invention based on a combination which could be easily reached from exemplary embodiments of the present invention is also included in the scope of the present invention.

Having described the present invention based on exemplary embodiments thereof in detail, the present invention is not limited to those specific exemplary embodiments, but various aspects without departing from the spirit of the present invention are also included in the scope of the present invention. The exemplary embodiments are given for illustration of aspects of the present invention, and the inventions which could be easily reached in view of the exemplary embodiments are also included in the scope of the present invention.

According to the present invention, in an imaging apparatus having a plurality of temperature sensors and a plurality of subarrays, data of a subarray and data of a temperature sensor may be associated easily.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-127537, filed Jun. 20, 2014, which is hereby incorporated by reference herein in its entirety.

What is claimed is:

1. An imaging apparatus comprising:
a sensor array having a plurality of subarrays each having a plurality of sensors, each of the plurality of sensors comprising a conversion element converting radiation or light to charges and outputting signals based on the charges; and
a plurality of temperature sensors which output signals based on temperatures of the sensor array,
wherein a signal output from one subarray of the plurality of subarrays and a signal of one temperature sensor of the plurality of temperature sensors are read out through a line to which one sensor included in the one subarray and the one temperature sensor are commonly connected.

2. The imaging apparatus according to claim 1, further comprising a control unit configured to control the sensor array and the temperature sensors.

3. The imaging apparatus according to claim 2, wherein the control unit controls the sensor array and the temperature sensor such that signals may be read out from the temperature sensor for each one frame in a period for reading out signals from reading target sensors for one frame in the sensor array.

4. The imaging apparatus according to claim 2, wherein the temperature sensor includes at least one or a plurality of diodes.

5. The imaging apparatus according to claim 4, wherein the diodes receive forward voltage; and
the control unit calculates the amount of change in temperature of the sensor array or temperature of the sensor array based on a signal based on the forward voltage in the diodes.

6. The imaging apparatus according to claim 4, wherein the temperature sensor has a signal amplification unit configured to amplify signals of the diodes and a signal holding unit configured to hold a signal output from the signal amplification unit.

7. The imaging apparatus according to claim 6, wherein the temperature sensor further has a second signal amplification unit different from the signal holding unit, the second signal amplification unit amplifying a reference signal which is a reference for a temperature of the sensor array, and a reference holding unit configured to hold a signal output from the second signal amplification unit.

8. The imaging apparatus according to claim 6, wherein the signal amplification unit includes at least one transistor.

9. The imaging apparatus according to claim 1, wherein the subarrays and the temperature sensors are placed on a common semiconductor substrate; and
the temperature sensors are placed in a region different from a region where the subarrays are placed on the semiconductor substrate.

10. The imaging apparatus according to claim 1, further comprising a signal reading unit configured to read out signals from the sensor arrays and signals from the temperature sensors through the line.

11. The imaging apparatus according to claim 1, further comprising
a row scanning circuit configured to scan a plurality of sensors in the subarray row by row, wherein the subarray has the plurality of sensors placed in a matrix; and
the row scanning circuit commonly scans the sensors and the temperature sensors of a predetermined row.

12. The imaging apparatus according to claim 1, wherein a plurality of the temperature sensors are placed in the subarray.

13. The imaging apparatus according to claim 2, wherein the control unit controls such that whether a signal based on an amount of change of the temperature of the sensor array can be read out from the temperature sensor may be determined based on a signal different from a signal for shifting the sensor array to an operating state.

14. An imaging system comprising:
the imaging apparatus according to claim 1; and
a processing unit configured to process an image captured by the imaging apparatus.

* * * * *